No. 749,744. PATENTED JAN. 19, 1904.
J. W. PACKARD & W. A. HATCHER.
MOTOR VEHICLE.
APPLICATION FILED NOV. 14, 1902.
NO MODEL. 2 SHEETS—SHEET 2.
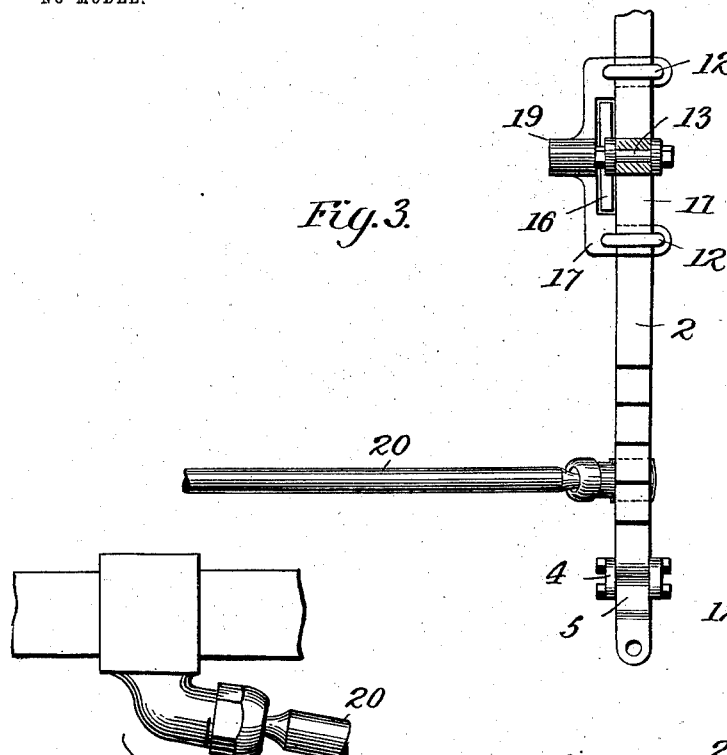
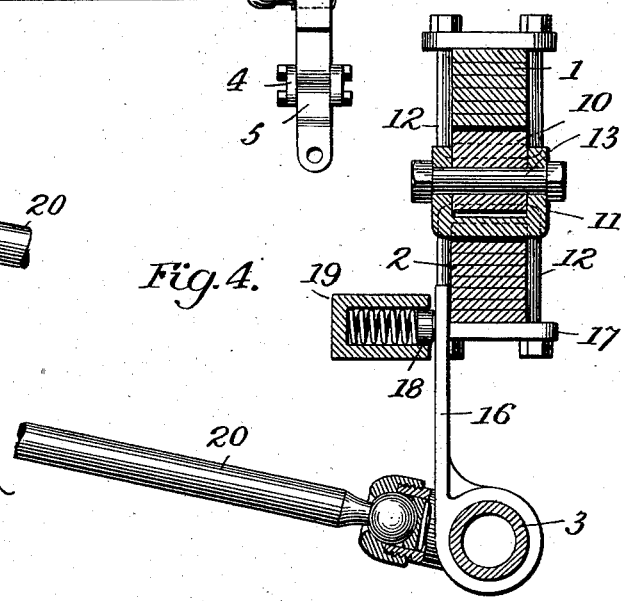
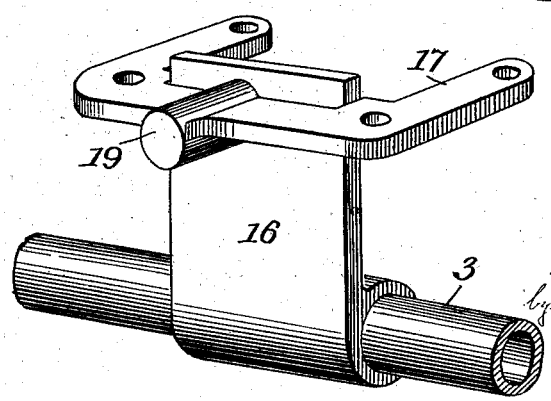
Witnesses
Inventors
James W. Packard
and William A. Hatcher
by Watson & Watson
Attorneys No. 749,744. Patented January 19, 1904.

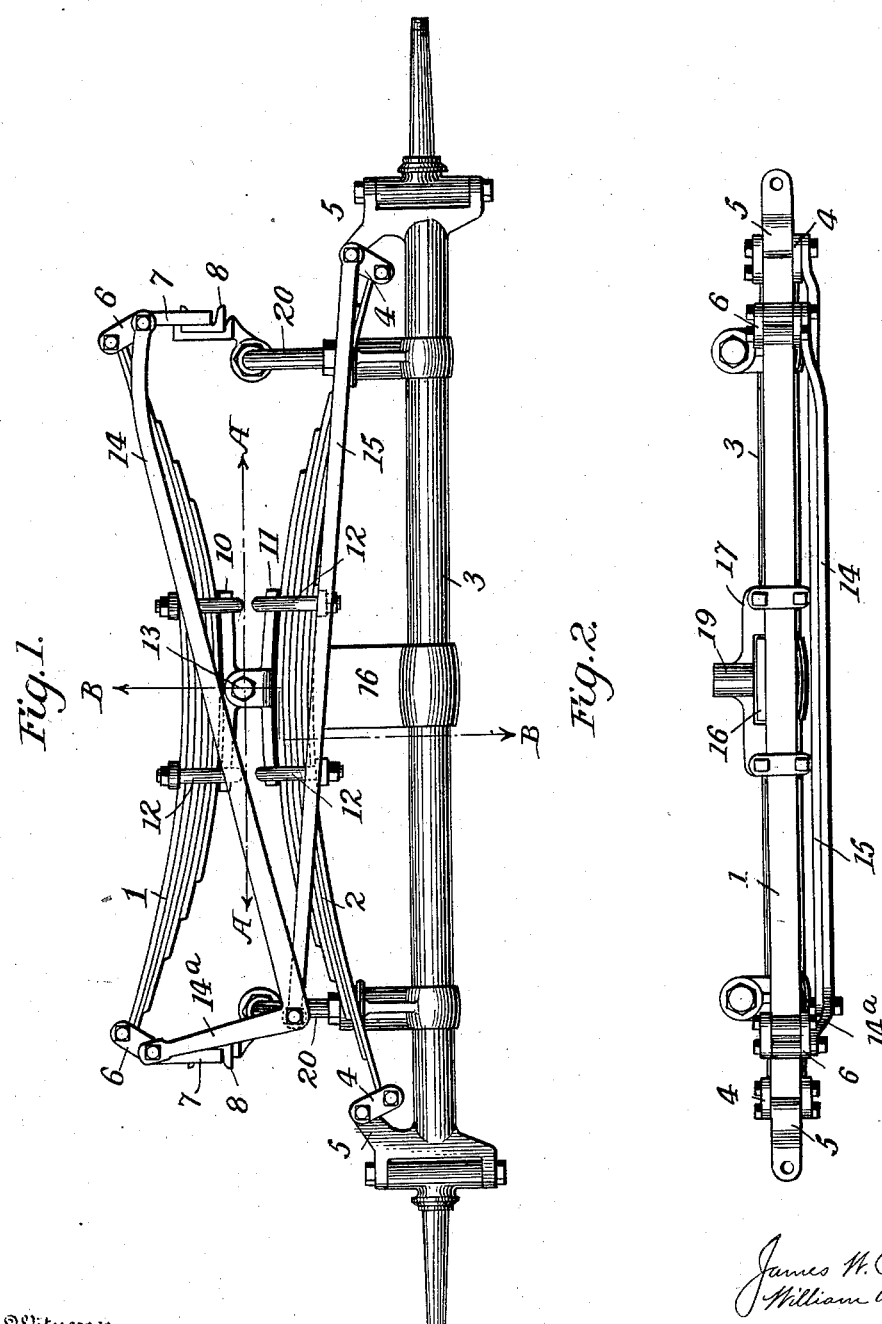

UNITED STATES PATENT OFFICE.

JAMES W. PACKARD AND WILLIAM A. HATCHER, OF WARREN, OHIO, ASSIGNORS TO PACKARD MOTOR CAR COMPANY, OF WARREN, OHIO, A CORPORATION OF WEST VIRGINIA.

MOTOR-VEHICLE.

SPECIFICATION forming part of Letters Patent No. 749,744, dated January 19, 1904.

Application filed November 14, 1902. Serial No. 131,326. (No model.)

*To all whom it may concern:*

Be it known that we, JAMES W. PACKARD and WILLIAM A. HATCHER, citizens of the United States, residing at Warren, in the county of Trumbull, State of Ohio, have invented certain new and useful Improvements in Motor-Vehicles, of which the following is a specification.

This invention relates to means whereby the forward axle of an automobile or other vehicle is permitted to rock freely in a vertical plane to conform to the inequalities of the road without imparting its rocking movement to the vehicle-body and means for preventing undue lateral movement in the vehicle-body.

The invention will be described in detail with reference to the accompanying drawings, in which—

Figure 1 is a front view of the forward spring and axle of a motor-vehicle. Fig. 2 is a plan view of the same. Fig. 3 is a partial plan view below the line A A of Fig. 1. Fig. 4 is a vertical sectional view mainly on the line B B of Fig. 1, and Fig. 5 is a detail.

Referring to the drawings, 1 2 indicate the upper and lower semi-elliptical springs, which are supported upon the forward axle 3 of a motor-vehicle and which in turn support the body thereof. As shown, lower section 2 is connected to links 4, supported by brackets 5 on the ends of the axle, and the upper section is connected to links 6, which are supported by a bracket 7, connected to the side frames 8 of the vehicle-body. The upper and lower spring-sections are provided at their adjacent middle portions with plates 10 and 11, which are connected to the springs by clips 12. The plates 10 and 11 are pivotally connected by a bolt 13, forming an axis in the direction of the length of the vehicle about which the springs may rock freely. The position of the upper spring and the vehicle-body will be determined largely by the movements of the vehicle-body imparted from the rear axle, while the lower spring will rock in conformity with the movements of the forward axle.

To prevent the vehicle-body from having a lateral movement relative to the axle, the body is braced from the axle in the following manner: A bar 14 is pivotally connected with the vehicle-body at one end, and at its opposite end it is pivotally connected with one end of a link 15, the other end of said link being connected with the forward axle, the bar 14 and link 15 being approximately equal in length to the vehicle-body. As shown, the bar is connected pivotally to the bracket 7 at the left side (looking forward) of the vehicle-body, and it extends nearly to the right side thereof. The link 15 is pivotally connected to the bracket 5 at the left end of the forward axle. In order to sustain the bar 14 in proper position relative to the body, it is provided with an arm $14^a$, which is connected to the bracket 7 at the right side of the vehicle. By means of the construction above described the forward axle is free to conform to any inequalities in the road by rocking about its pivot 13 without disturbing the poise of the vehicle-body, while at the same time the vehicle-body is prevented from undue lateral movement.

The forward axle 3 tends to rock or rotate when the wheels are turned to the right or left to steer the vehicle, and it also tends to move backward and forward relatively to the spring as the wheels meet obstructions on the road. The following devices effectively prevent these movements and hold the axle in its proper position. The rocking or rolling movement of the axle is prevented by a plate 16, located on and rigidly connected to the middle of the axle, which plate extends vertically upward and slides within a yoke 17, connected to the under spring 2. A spring-pressed plunger 18 bears on the plate 16 and prevents it from rattling, the spring for the plunger being carried within a cup 19 on the yoke 17.

To prevent the forward and backward movement of the axle bodily, it is connected with the body by a pair of links 20, one located near each end of the axle. The said links are connected with the axle and the body by ball-and-socket joints, permitting of universal movement.

Having described the invention, what is claimed as new is—

1. In a motor-vehicle, the combination with the forward axle and the vehicle-body, of a semi-elliptic spring connected to the axle, and a second semi-elliptic spring connected with the body, said springs being centrally connected by a pivot-joint.

2. In a motor-vehicle, the combination with the forward axle of a semi-elliptic spring connected with the axle at its ends, a second semi-elliptic spring connected to the vehicle-body at its ends, a pivot located between and connecting said springs centrally, and a link and bar pivotally connected with the axle and the vehicle-body and with each other.

3. In a motor-vehicle, the combination with a forward axle, of a spring supported on said axle, a second spring supported on and pivotally connected to the first-named spring, a vehicle-body supported on said second spring, and lateral braces whereby lateral movement of the vehicle-body relatively to the axle is prevented.

4. In a motor-vehicle, the combination with a forward axle, the vehicle-body, the semi-elliptic springs connected respectively to said axle and vehicle-body, and the pivot-joints between said springs, of the bar 14 connected to the body at one side, the arm 14$^a$ connecting said bar to the body at its opposite side, and the link extending across the vehicle and connecting said bar with the axle.

5. In a motor-vehicle, the combination with a body, the forward axle, and the intermediate spring, of the vertically-arranged plate 16 rigidly connected to said axle, means carried by the spring for guiding said plate, and supplemental means for preventing the plate from rattling in said guide, for the purpose set forth.

6. In a motor-vehicle, the combination with a body, the forward axle and the intermediate spring, of braces pivotally connecting said axle with the body, a vertically-arranged plate rigidly connected to said axle, and means for guiding said plate vertically, for the purpose set forth.

7. In a motor-vehicle, the combination with a body, the forward axle, and the intermediate spring, of the vertically-arranged plate, 16, rigidly connected to the axle, guiding means for said plate carried by the spring, and a yielding device bearing laterally against said plate and preventing the same from rattling, for the purpose set forth.

In testimony whereof we affix our signatures in presence of two witnesses.

JAMES W. PACKARD.
WM. A. HATCHER.

Witnesses:
   ARA C. HARRINGTON,
   G. B. POST.